3,021,597
PRESSURE BAR WOOD SAW
William John Sampson, 524 W. 42nd St., New York, N.Y.
Filed Oct. 17, 1960, Ser. No. 63,153
3 Claims. (Cl. 30—166)

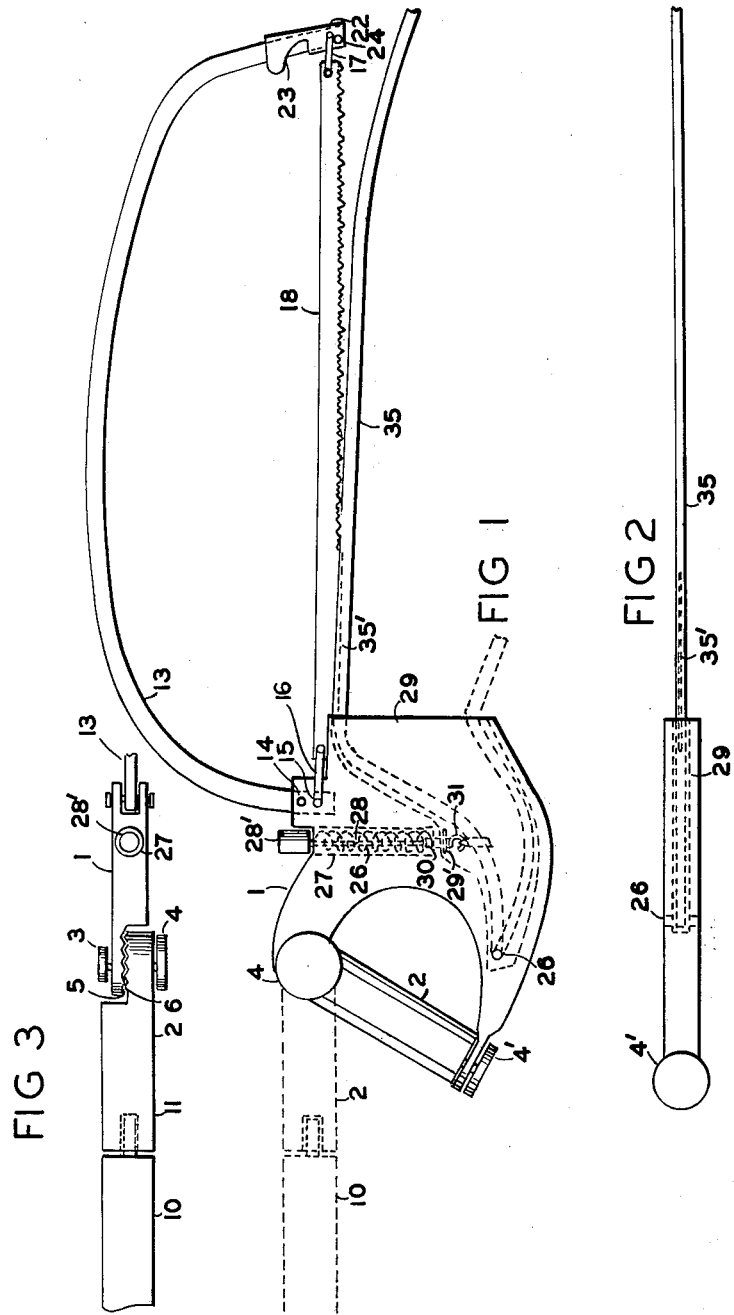

This invention relates to wood saws having pressure bars and more particularly to such means for cutting off tree branches.

The application is an improvement of copending application for automatic Presure Bar Wood Saw, Serial No. 816,015 and filed May 26, 1959, now Patent 2,984,004, issued May 16, 1961, by Arthur H. Dalby-Balls, and assigned to applicant herein. That application shows a wood saw having a spring loaded pressure bar which is pivoted on the handle close to the axis of the saw blade. Due to the closeness of the mounting pivot of the pressure bar it is possible for some branches to become wedged between the saw blade and the pressure bar.

The present invention solves this difficulty by displacing the pivot of the pressure bar from the axis of the saw blade by an amount sufficient to substantially eliminate the wedging effect.

Accordingly, a principal object of the present invention is to provide new and improved pressure bar wood saws.

Another object of the invention is to provide new and improved pressure bar wood saws having a pivotally mounted pressure bar displaced from the axis of the saw blade so as to minimize the possibility of wedging a branch between said blade and said pressure bar.

Another object of the invention is to provide new and improved pressure bar saw means having removable saw blades.

Another object of the invention is to provide new and improved pressure bar saw means having a pressure bar which is adjustably spring loaded toward the saw blade, said pressure bar being curved and adapted to contact the saw blade near the handle and then diverging out from the saw blade so that there is normally a space between the saw blade and the pressure bar at their free ends in order to facilitate the entry of tree branches between them.

Another object of the invention is to provide new and improved pressure bar wood saws adapted to be used as hand saws or with an extension handle.

These and other objects of the invention will be apparent from the following specification and drawings, of which FIGURE 1 is a side view of the embodiment of the invention.

FIGURE 2 is a bottom view of the embodiment of FIGURE 1.

FIGURE 3 is a partial top view of the embodiment of FIGURE 1.

Referring to the figures the invention generally comprises a handle 1. A hand grip 2 is adjustably connected to the upper end of the handle 1 by means of the threaded stud 3 and locking nut 4. The hand grip 2 is adapted to be adjustably locked to the handle 1 by means of the serrated locked members 5 connected to the handles 1 and 6 connected to the grip 2. When the hand grip 2 is in an extended position shown by the dotted lines, an extension member 10 may be connected to the end thereof by means of the threaded stud 11 connected to the extension member being screwed into the threaded shaft of the member 2, providing smooth hand grips.

A saw is attached to the handle. The saw comprises a frame member 13 which is attached to the handle 1 by means of the screws 14, 15. The frame 13 has mounting means 16, 17 for mounting a removable saw blade 18 in the same manner as conventional bow saws. The members 16 and 17 are preferably adjustable in conventional manner to vary the tension on the saw blade 18. The arm 17 is pivotally mounted by pin 22 to locking lever 23 which in turn is pivotally mounted to the end of the frame 13 by pin 24. The locking lever 23 has an extension which bears against the edge of the frame member 13. This arrangement shifts the holding force from one side to the other of pin 24 in conventional manner.

The pressure bar 35 is pivotally mounted on the handle member 1 by means of the pin 26. The pressure bar is pivoted away from the blade 18 a distance approximately equal to the length of hand grip 2. This eliminates any wedging effect between bar 35 and blade 18 when a branch is engaged between them. The pressure bar curves from its mounting and towards the saw blade and in normal position contacts the saw blade 18 adjacent to its end. The pressure bar 35 has a small slot 35' where it contacts blade 18, to facilitate the final strokes and provide a clean edge when cutting a branch. The pressure bar then curves away from the saw blade and it extends in a slight curvature, diverging away from the saw blade so that there is a space at the end of the pressure bar between the pressure bar 35 and the saw blade 18. The purpose of this is to facilitate the entry of branches, especially branches which are small and liable to bend away. The pressure bar extends beyond the saw blade to facilitate catching the branches.

The pressure bar is spring loaded in its normal position by means of the adjustable spring 26. The spring 26 is mounted in a shaftway 27 in the handle 1 and its lower end bears against a shoulder in shaftway 27. A shaft member 28, which is threaded, extends through the spring along the axis thereof. An extension member 30 is threaded onto the member 28 and has a hook or loop 31 on its other end which engages the pressure bar 35. The strength of the spring is adjusted by turning the knob 28' connected to the member 28, thereby compressing or expanding the spring 26. Collar 29' on member 30 permits easy connection or disconnection of the pressure bar.

Referring to FIGURE 2 the pressure bar 35 is mounted in a slotted portion 29 of the handle 1. The present device may be used as a hand saw by turning the hand grip 2 to the position shown in full lines in FIGURE 1 and locking it in that position by means of the locking nut 4. An additional locking stud 4' may be connected if desired to secure the other end of the hand grip 2 to the other end of the handle 1, the lower end of the handle 1 being forked to accommodate the lower end of the hand grip.

When it is desired to use the saw with an extension handle for cutting high branches the hand grip is extended out to the position shown in the dotted lines in FIGURE 1 and an extension member 10 may be screwed into the end of the hand grip 2 as shown in FIGURE 1. Additional extension members may be added in series in similar manner. When the hand grip is in this position the extension members extend substantially along the axis of the saw blade.

Therefore, the present invention has the following advantages:

(1) Elimination of wedging.
(2) Elimination of the damaging effects that the strain of wedging causes on blade and bar, i.e., with extension cutting at a distance there is but one means to regulate the length of the cutting stroke, that is by the feel of the saw. As the pressure is automatic, this can only be achieved once the branch is inserted by pushing the branch against its closed end. There is a natural urge to return after each stroke (more or less) to regain this feel of the saw. So the blade and bar got undue strain, which is now eliminated with the present design.
(3) Handle between bar and saw acts as buffer.
(4) Cuts larger branches.
(5) The tension of the pressure bar is equal throughout, mainly because of substantially straight uplift action in all positions, instead of the scissor action.

Many modifications may be made by those who desire to practice the invention without departing from the scope thereof which is defined by the following claims.

I claim:

1. A tree branch saw comprising a handle, a straight saw blade mounted on said handle, a pressure bar pivotally mounted on a pivot on said handle, said pivot being spaced away from the axis of said blade a distance substantially equal to a conventional hand grip to prevent any wedging of branches between said bar and said blade, a spring connected to adjustably spring load said pressure bar towards said saw blade, said pressure bar being normally connected and spring loaded to touch said saw blade adjacent its mounting on said handle and being curved toward said blade adjacent said pivot and then extending outwardly in a straight line to present a straight line edge that diverges away from said saw blade so that a branch may easily enter between said saw blade and said pressure bar, and a stiffening member mounted on said handle and connected to the free end of said blade.

2. A tree branch saw comprising a handle, a straight saw blade mounted on said handle, a pressure bar pivotally mounted on a pivot on said handle, said pivot being spaced away from the axis of said blade a distance substantially equal to a conventional hand grip to prevent any wedging of branches between said bar and said blade, a spring connected to adjustably spring load said pressure bar towards said saw blade, said pressure bar being normally connected and spring loaded to contact said saw blade adjacent its mounting on said handle and being curved toward said blade adjacent said pivot and then extending outwardly in a straight line to present a straight line edge that diverges away from said saw blade so that a branch may easily enter between said saw blade and said pressure bar, and a buffer member connected to said handle and extending over the contact point of said bar and said saw blade.

3. A tree branch saw comprising a handle, said handle comprising a rotatably mounted hand grip, and connection means in said hand grip to receive extension members, a straight saw blade mounted on said handle, a pressure bar pivotally mounted on a pivot on said handle, said pivot being spaced away from the axis of said blade a distance substantially equal to said hand grip to prevent any wedging of branches between said bar and said blade, and a spring connected to adjustably spring load said pressure bar towards said saw blade, said pressure bar being shaped to touch said saw blade adjacent its mounting on said handle and then extending outwardly in a straight line to present a straight line edge that diverges away from said saw blade and said pressure bar.

References Cited in the file of this patent
UNITED STATES PATENTS

| | | |
|---|---|---|
| 1,697,088 | Reed | Jan. 1, 1929 |
| 1,868,349 | Ditch | July 19, 1932 |

FOREIGN PATENTS

| | | |
|---|---|---|
| 40,963 | Germany | Sept. 24, 1887 |
| 161,860 | Germany | Aug. 3, 1903 |